United States Patent [19]

Koblitz et al.

[11] Patent Number: 5,300,865
[45] Date of Patent: Apr. 5, 1994

[54] SELF ADJUSTING BLANKING SIGNAL GENERATOR

[75] Inventors: Rudolf Koblitz, Meylon; Steffen Lehr, Villingen-Schwenningen, both of Fed. Rep. of Germany

[73] Assignee: Deutsche Thomson-Brandt GmbH, Villingen-Schwenningen, Fed. Rep. of Germany

[21] Appl. No.: 936,406

[22] Filed: Aug. 31, 1992

Related U.S. Application Data

[63] Continuation of PCT/EP90/02220, Dec. 18, 1990.

[30] Foreign Application Priority Data

Feb. 10, 1990 [DE] Fed. Rep. of Germany ....... 4004161

[51] Int. Cl.5 ............... G09G 1/04; H01J 29/70
[52] U.S. Cl. ..................... 315/384; 315/386
[58] Field of Search ............... 315/384, 383, 386, 411

[56] References Cited

U.S. PATENT DOCUMENTS 4,134,046  1/1979  Ahmed ................. 315/384
4,260,935  4/1981  Colombo ............... 315/384
4,942,471  7/1990  Chikuma et al. ........ 315/384

Primary Examiner—Gregory C. Issing
Attorney, Agent, or Firm—Joseph S. Tripoli; Peter M. Emanuel; Richard G. Coalter

[57] ABSTRACT

A scanning circuit which utilizes blanking pulses between flyback pulses in a display device includes a line blanking circuit which prevents the generation of spurious blanking pulses by ringing in the blanking pulses. The line blanking circuit includes a capacitor for storing a reference voltage. A comparator is responsive to the reference voltage and to the flyback pulses and provides the blanking pulses when the flyback pulses exceed the reference voltage. The comparator is prevented from resetting for a preselected time period after the falling edge of the blanking pulse and spurious blanking pulses can not be generated during the preselected time period.

9 Claims, 3 Drawing Sheets

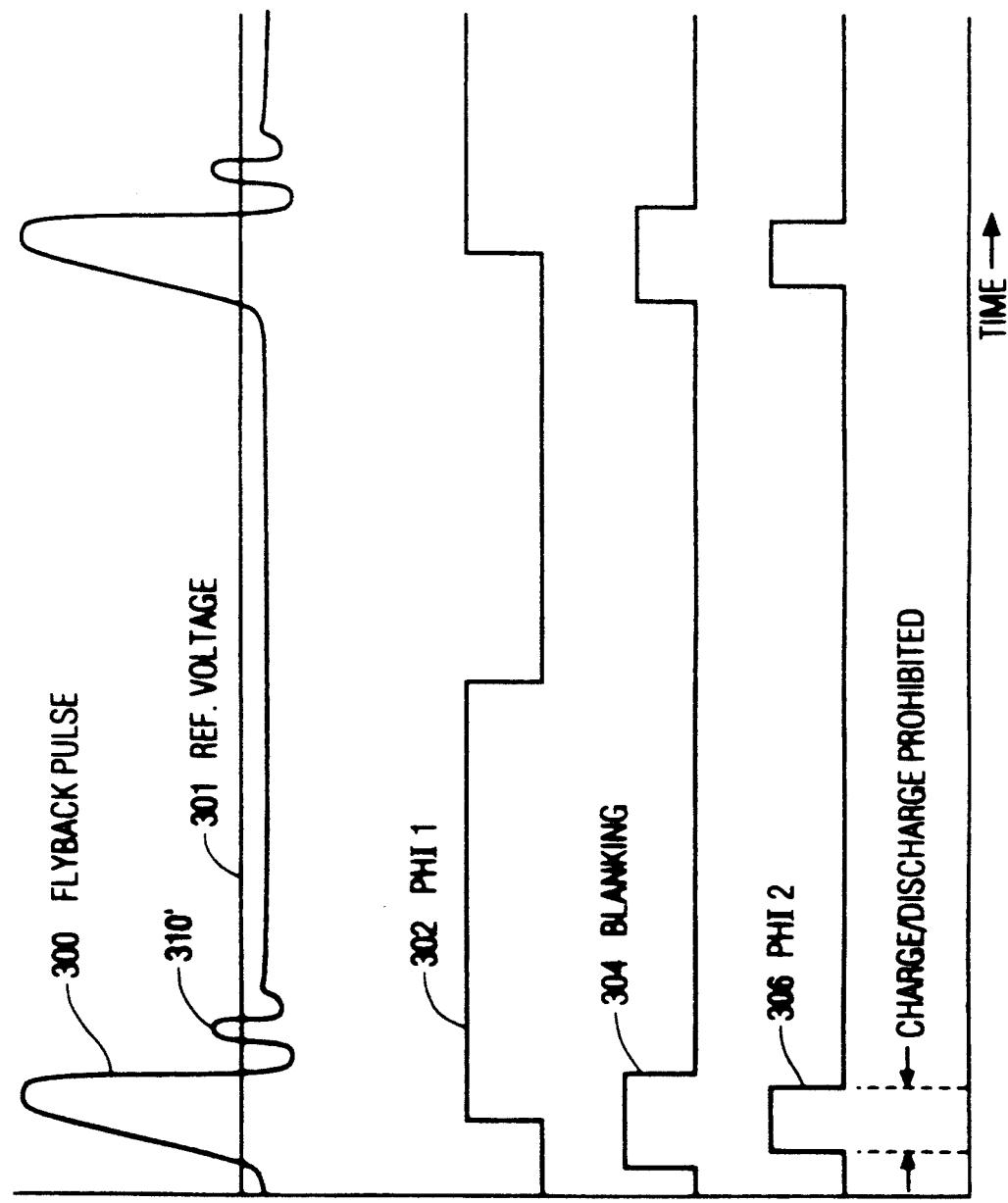

SELF ADJUSTING BLANKING SIGNAL GENERATOR

This is a continuation of PCT application PCT/EP 90/02220 filed Dec. 18, 1990 by Rudolf Koblitz and Steffen Lehr and titled "Line Blanking Circuit".

This invention is directed to a circuit for generating a line blanking pulse in picture reproduction devices, such as television receivers. In picture reproduction devices using a line scanning pattern, the electron beam is blanked during the horizontal retrace in order to avoid disturbing stripes in the picture displayed. A line blanking pulse is required for this blanking. The balancing pulse is normally generated from the horizontal flyback pulse, which is often also loaded by high voltage rectification diodes and therefore a deformed flyback pulse results. The flyback pulse (FIG. 1) approximately consists of a negative direct voltage which is overlaid by positive half sine wave shaped pulses during the line retrace, therefore the greater part of the flyback pulse is positive. However, the line output transformer is under load and generates undesirable ringing in the flyback pulse.

In a comparator circuit shown in TEA 2029 from the Thomson Semiconductors Data Book 1986, consumer IC's, a line blanking pulse is obtained from the flyback pulse by using a threshold voltage and a comparator. However, a compromise must be made in the selection of the level of the threshold voltage. The threshold voltage can be set higher resulting in the advantage of producing a clean blanking pulse. However, the blanking pulse is relatively short and late starting. Alternatively, the threshold voltage can be set lower resulting in the advantage of gaining a line blanking pulse having an early start and longer duration, but with the qualified risk of after-blanking because of ringing. The threshold voltage of the comparator circuit can be momentarily exceeded by pulse peaks at the end of the half sine wave and the comparator circuit generates additional output pulses which can blank the active frame at the edge of the scanned picture.

It is the object of the invention to provide an improved line blanking circuit which generates an early starting line blanking pulse but which does not generate spurious additional blanking pulses.

With the invention, the threshold voltage is set low and setting of the comparator circuit is prevented by a supplementary circuit within the comparator circuit for a time period beginning with the descending edge of the half sine wave and having a time duration which insures that ringing has decayed to a level which prevents spurious blanking pulses.

A preferred embodiment is described with reference to the drawings, in which:

FIG. 3 is a timing diagram illustrating operation of the blanking circuit of FIG. 2.

Figure 1:
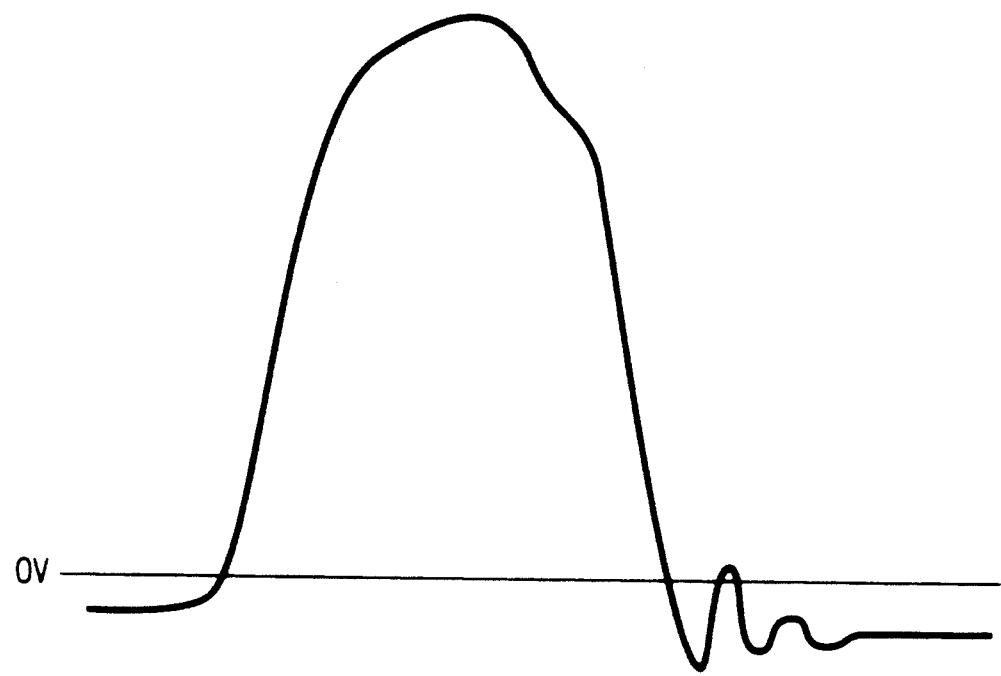
FIG. 1 shows a flyback pulse with ringing.

FIG. 1 shows a typical flyback pulse. The amplitude has a value of 63 V, for example, thus the positive peak of the flyback pulse is a voltage of about 60 V above the illustrated 0 V line. Ringing pulses occur at end of the flyback pulse, the first of the ringing pulses projects above the 0 V line. The flyback pulse can also have reversed polarity and be correspondingly inverted.

Figure 2:
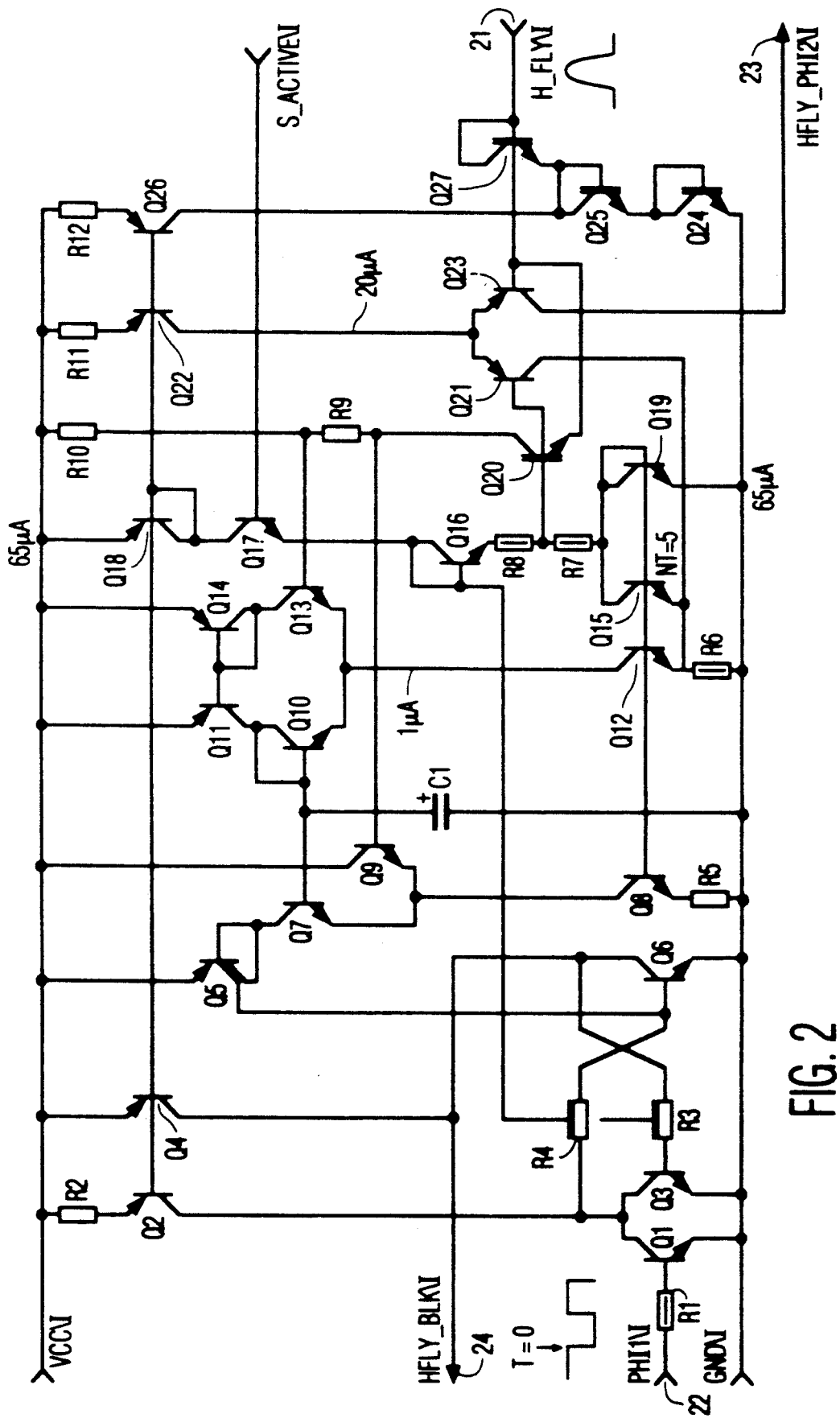
FIG. 2 is a preferred embodiment of a line blanking circuit.

FIG. 2 shows a line blanking circuit having a flyback pulse input terminal 21. The flyback pulse is connected to the input terminal 21 by a protective resistor (not shown). The transistors Q21 and Q23 form a comparator. The flyback pulse is applied to the base of transistor Q23 and a threshold voltage of, for example, 1.3 V, is applied to the base of transistor Q21 as a reference voltage. The emitter of transistor Q20 then has a voltage of about 0.6 V. According to the above example, the flyback voltage is $-3$ V during the line trace. The voltage over the protective resistor (about 3.6 V) and its resistance value determine the load independent current which flows into the input terminal 21.

A PHI1 signal, which is already present in the picture reproduction device, is applied to input terminal 22. The PHI1 signal is a square wave signal at line frequency and changes its logic level approximately in the temporal middle of the flyback pulse. This is illustrated in FIG. 3 by waveforms 300 (the flyback pulse) and 302 (the PHI1 signal). The flyback pulse is to be expected in the area of, for example, $\pm 5$ micro-seconds, around the PHI1 edge.

In the operation of the invention, a capacitor C1 is charged to a reference voltage by the load independent current at input terminal 21 during the line trace. When the rising edge of the flyback pulse causes a 5 percent (for example) lower load independent current, the line blanking pulse becomes active. The charging of the capacitor C1 is maintained for a selected time period. When the load independent current again rises above 95 percent (for example) of the value it had during the line trace, the line blanking pulse is terminated. The edge of the PHI1 signal is located in the middle of the flyback pulse and prevents, for the duration of the pulse, the generation of another line blanking pulse which could be caused by ringing in the flyback pulse. Following the selected time period, another line blanking pulse can be generated using the PHI1 signal, for example.

The capacitor C1 has, for example, a value of 10 to 15 pF. Because this is a small capacitance (and is therefore easily integrated), the charging current supplied by transistor Q12 and the discharging current should also have a corresponding value of about one micro-ampere. The output terminal 23 supplies a square wave signal PHI2, which is derived from the flyback pulse, and whose switch edges lie within the line blanking pulse to be generated. This is shown in FIG. 3 by waveform 306. The PHI2 signal therefore is substantially temporally centered within the line blanking pulses. The PHI2 signal is used internally to limit the charging and discharging of capacitor C1 to particular time periods. Therefore, reasonable charging and discharging voltages are the advantageous result, despite the small capacitance of capacitor C1. The start of the time period coincides with the rising edge of the PHI2 signal and the end of the time period coincides with the descending edge of the PHI2 signal.

Before the flyback pulse starts, the capacitor C1, in the line blanking circuit, is charged by the voltage which is generated by the load independent current at the base of transistor Q13. The load independent current is determined by the protective resistor and the negative direct voltage of the flyback pulse during the line trace. The voltage at capacitor C1 is a reference voltage. The line blanking circuit is self-adjusting and adjusts itself to level tolerances of the flyback pulse automatically because it is clamped to the reference voltage during the line trace. Alignment is no longer necessary. Ringing in the line output transformer is no longer disturbing because the start of another line blanking pulse is blocked by the PHI2 signal.

The transistors Q10 and Q13 form a difference amplifier and the transistors Q11 and Q14 are current mirrors. Resistors R9 and R10 form a voltage divider. The ratio of the resistors R9 and R10 (for example, 500/10,000 corresponding to 5 percent) determines the percentage by which the voltage at the base of transistor Q9 must increase in comparison to the voltage on the capacitor C1 to activate the line blanking pulse (304 in FIG. 3). When the voltage at the base of transistor Q9 falls below of the voltage on the capacitor C1 the line blanking pulse is terminated. At this time, the voltage at the base of transistor Q13 is higher by 5 percent than the voltage on the capacitor C1.

The base of transistor Q20 is clamped to a voltage of 1.3 V by the resistors R7 and R8. When the positive edge of the flyback pulse passes over the threshold voltage of 1.3 V, the voltage at resistor R6 is raised via the comparator composed of transistors Q21 and Q23. Thus, an image of the PHI2 signal appears at the resistor R6. The PHI2 image lies partly within the line blanking pulse which is to be formed and is derived from a section of the flyback pulse which is guaranteed to be free from ringing.

The difference amplifier composed of transistors Q10 and Q13 is supplied with a current of, for example, one micro-ampere, and the capacitor C1 is charged or discharged according to the voltages at the bases of transistors Q10 and Q13 so long as the PHI2 signal is not active. A reference voltage adjusts itself via the capacitor C1 during the line trace. This reference voltage is to be maintained during the flyback pulse. Therefore, the current of the difference amplifier composed of transistors Q10 and Q13 is switched off when the PHI2 signal initially appears. The stored value of the reference voltage on the capacitor C1 could change in the time span between the start of the line blanking pulse and the first point in time. A corresponding alteration can also appear if the second point in time does not exactly coincide with the end of the line blanking pulse. However, due to the steep rising and falling edges of the flyback pulse, the 15 pF capacitance of capacitor C1, the small charging current of one micro-ampere and the negligible leakage current of the capacitor C1, the reference voltage stored by the capacitor C1 is practically unaffected during this short time span.

The two transistors Q3 and Q6 and the two resistors R3 and R4 form a flip-flop which is triggered by the transistor Q5 and by the PHI1 signal via transistor Q1. The PHI1 signal prevents an undesired setting of the line blanking pulse through ringing of the flyback pulse. The line blanking signal is available as an output signal of the flip-flop at the output terminals 24. The line blanking circuit can be modified for use with an inverted flyback pulse at the input terminal 21.

We claim:

1. In a scanning circuit utilizing blanking pulses between flyback pulses of a flyback signal in a display device, a self-adjusting line blanking circuit for adjusting itself to the flyback pulse automatically and for preventing the generation of spurious blanking pulses by ringing in said flyback pulses, said line blanking circuit comprising:
   storage means;
   circuit means for deriving a reference voltage from said flyback signal and for storing said reference voltage in said storage means;
   comparison means responsive to said stored reference voltage and to said flyback pulses for providing said blanking pulses when said flyback pulses exceed said reference voltage;
   first preventing means for preventing resetting of said comparison means for a preselected time period after the falling edge of said blanking pulses; and
   second preventing means for preventing a change in the stored reference voltage during a portion of each blanking pulse interval for limiting the stored voltage.

2. The line blanking circuit of claim 1 further including:
   an input terminal for receiving a first switching signal having a first edge at the approximate temporal center of said flyback signals and a second edge between two of said flyback signals; and
   means for applying said first switching signal to said first preventing means for controlling the value of said preselected time period to lie between said first and second edges of said first switching signal.

3. The line blanking circuit of claim of claim 1 wherein said second preventing means comprises:
   means for deriving a control signal from said flyback pulse that is substantially temporally centered within said flyback pulse; and
   means for applying said control signal to an input of said second preventing means for determining the portion of each blanking interval during which changes in said stored reference voltage are prevented by said second preventing means.

4. The line blanking circuit of claim 1 wherein said storage means includes a capacitor and said circuit means includes means for charging said capacitor during a trace interval of said flyback signal to produce said reference voltage.

5. The line blanking circuit of claim 4 further including a voltage divider for determining the percentage of voltage change relative to said reference voltage stored in said storage means needed to activate a line blanking pulse.

6. Blanking apparatus, comprising:
   an input for receiving a flyback signal having a flyback pulse which tends to exhibit ringing;
   a capacitor;
   circuit means for charging and discharging said capacitor to store a reference voltage in said capacitor representative of said flyback signal;
   a comparator responsive to said stored reference voltage and to said flyback signal for producing blanking pulses;
   a second input for receiving a line rate pulse signal having an edge coincident with said flyback pulses;
   first preventing means responsive to said line rate pulse signal for preventing said comparator from producing said blanking pulses in response to said ringing of said flyback pulse; and
   second preventing means for limiting the charging and discharging of said capacitor to particular time periods.

7. Blanking apparatus as recited in claim 6 wherein said second preventing means includes:
   means for deriving a control signal from said flyback signal, said control signal comprising a pulse substantially temporally centered within each blanking pulse; and means for preventing charging and discharging of said capacitor in response to said control signal for limiting the maximum capacitor voltage.

8. Blanking apparatus as recited in claim 6 wherein said capacitor is formed in an integrated circuit.

9. Blanking apparatus, comprising:

an input for receiving a flyback signal having a flyback pulse which tends to exhibit ringing;

a capacitor formed in an integrated circuit;

circuit means for charging and discharging said capacitor to store a reference voltage in said capacitor representative of said flyback signal;

a comparator responsive to said stored reference voltage and to said flyback signal for producing blanking pulses;

means for deriving a control signal from said flyback signal, said control signal comprising a pulse substantially temporally centered within each blanking pulse; and means for preventing charging and discharging of said capacitor in response to said control signal for limiting the maximum capacitor voltage.

* * * * *